United States Patent
Priebatsch

(10) Patent No.: US 9,947,183 B2
(45) Date of Patent: *Apr. 17, 2018

(54) PAYMENT PROCESSING WITH AUTOMATIC NO-TOUCH MODE SELECTION

(71) Applicant: Seth Priebatsch, Boston, MA (US)

(72) Inventor: Seth Priebatsch, Boston, MA (US)

(73) Assignee: SCVNGR, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,351

(22) Filed: Nov. 18, 2016

(65) Prior Publication Data

US 2017/0103622 A1 Apr. 13, 2017

Related U.S. Application Data

(63) Continuation of application No. 14/283,771, filed on May 21, 2014, now Pat. No. 9,530,289, which is a continuation of application No. 13/939,434, filed on Jul. 11, 2013, now Pat. No. 8,770,478.

(51) Int. Cl.
*G06K 15/00* (2006.01)
*G07G 1/00* (2006.01)
*G06K 7/14* (2006.01)

(52) U.S. Cl.
CPC ......... *G07G 1/0045* (2013.01); *G06K 7/1413* (2013.01); *G06K 7/1417* (2013.01)

(58) Field of Classification Search
CPC ......... G06Q 30/06; G06Q 20/20; G06K 15/00
USPC ................................. 235/383, 381
See application file for complete search history.

(56) References Cited

U.S. PATENT DOCUMENTS 8,770,478 B2 * 7/2014 Priebatsch ............. G06Q 90/00
235/380
9,530,289 B2 * 12/2016 Priebatsch ............. G06Q 90/00

* cited by examiner

*Primary Examiner* — Ahshik Kim
(74) *Attorney, Agent, or Firm* — Morgan, Lewis & Bockius LLP

(57) ABSTRACT

A "no-touch" mobile checkout experience frees consumers from the need to manually locate and activate a mobile payment application in order to complete a transaction. The consumer simply brings his mobile device within close range of an interface console, which in various embodiments prompts the device to launch an application that causes display of a payment token without user action. If the consumer's device is not NFC-capable, the interface console can read a displayed token optically in the usual fashion.

12 Claims, 6 Drawing Sheets

PAYMENT PROCESSING WITH AUTOMATIC NO-TOUCH MODE SELECTION

CROSS-REFERENCE TO RELATED APPLICATION

This application is a continuation of and claims priority to U.S. Ser. No. 14/283,771, filed on May 21, 2014, which is itself a continuation of U.S. Ser. No. 13/939,434, filed on Jul. 11, 2013, the disclosures of which are hereby incorporated by reference in their entireties.

TECHNICAL FIELD

The present invention relates, in general, to payments made with mobile devices, and, in particular, to payment processing without the need for user selection of a payment authentication modality.

BACKGROUND

It is common practice for consumers to conduct electronic transactions with merchants for goods or services received. Electronic payments are typically made with a token that identifies a source of funding. For example, a credit card containing a magnetic strip is a token. The payment tokens usually contain static information, such as an account number, identifying a source of payment. When a credit card is swiped, the card number is transmitted to a centralized payment-processing system. A physical token such as a credit card cannot be easily modified and, in the event that it is lost or stolen, the consumer must report the lost card and wait for a replacement to be mailed. As a result, systems that allow a consumer to pay for a transaction at the point of sale (POS), using a mobile device to display a token (usually in the form of a barcode or QR code), are becoming widely accepted. In fact, due the ease tl generating and replacing these tokens, mobile tokens for a wide variety of transaction types (payment tokens, ticket tokens, promotional offer tokens, etc.) are being developed. However, just as a consumer may take a few minutes to locate the appropriate credit card in his wallet, he may struggle to locate the appropriate application on his mobile device to display the token. Launching the application, once found, is another step the consumer must typically take before the token is displayed.

Accordingly, there is a need for a mobile transaction system that improves the ease and efficiency of the consumer's experience in completing a payment transaction.

SUMMARY

In various embodiments, the present invention provides a "no-touch" mobile checkout experience that frees consumers from the need to manually locate and activate a mobile payment application in order to complete a transaction. The consumer simply brings his mobile device within close range of an interface console, which in various embodiments prompts the device to launch an application that causes display of a payment token without user action. If the consumer's device is not NFC-capable, the interface console can read a displayed token optically in the usual fashion.

Accordingly, in one aspect, the invention pertains to a method of processing a transaction between a consumer and a merchant. In representative embodiments, the method includes receiving, from a remote token-generating server, a token by a device of the consumer and storing the token in a memory of the device; positioning, by the consumer, a display of the device within view of an optical scanner of a merchant checkout system capable of NFC communications; if the device is NFC enabled and within NFC range of the checkout system, establishing, without action by the consumer, an NFC communication channel between the device and the checkout system, communicating, by the checkout system, over the communication channel a request to display the stored token, in response to the request, displaying, by the device, the stored token, optically reading and electronically decoding, by the checkout system, the token upon presentation thereof by the device, and completing, by the checkout system, the transaction based at least in part on the decoded token information; and if the device is incapable of NFC communications, in response to an action by the consumer, displaying, by the device, the stored token, optically reading and electronically decoding, by the checkout system, the token upon presentation thereof by the device, and completing, by the checkout system, the transaction based at least in part on the decoded token information.

The request may specify a type of stored token to display. In various embodiments, the checkout system receives a decryption key from the token-generation server. The device may receive and store a plurality of tokens. The device may be NFC-enabled and may poll its environment, by regularly transmitting an NFC signal, for NFC circuitry within NFC range.

In another aspect, the invention relates to a checkout system. In various embodiments, the checkout system includes NFC circuitry for establishing a communication channel with an NFC-enabled device within an NFC range and communicating over the communication channel a request to display a token; an optical scanner for reading an optically displayed token within a field of view of the scanner; reading circuitry, responsive to the optical scanner, for electronically decoding the token; and a processor for completing the transaction based at least in part on the decoded token. The NFC circuitry may be contained in an NFC tag and/or may be configured to be powered by an external NFC signal.

In another aspect, the invention relates to a wireless device. In various embodiments the wireless device includes a processor; a memory; a display; telecommunication circuitry for establishing, via the public telephone network, a channel for secure data exchange with a remote token-generating server; NFC circuitry for establishing NFC communications with an NFC-capable merchant checkout system; and a control application, executable by the processor and configured for causing storage, in the memory, of a token received from the token-generating server by the telecommunication circuitry, causing display of an action button on the display, causing the NFC circuitry to monitor for availability of NFC, where NFC availability is detected by the NFC circuitry, autonomously establishing an NFC communication channel, detecting an external request received via the NFC channel to display the stored token, and in response, causing the stored token to appear on the display without user action, and where NFC availability is not detected by the NFC circuitry, causing the stored token to appear on the display only upon user selection of the displayed button.

In various embodiments, the control application is configured for receiving a plurality of tokens and causing storage thereof in the memory. Additionally, the control application may be configured to detect a request to display a particular type of token from the plurality of tokens and to responsively cause a token of the requested type to appear on the display.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. In addition, the terms like "consumer equipment," "mobile station," "mobile," "communication device," "access terminal," "terminal," "handset," and similar terminology, refer to a wireless device (e.g., cellular phone, smart phone, computer, PDA, set-top box, Internet Protocol Television (IPTV), electronic gaming device, printer, and so forth) utilized by a consumer of a wireless communication service to receive or convey data, control, voice, video, sound, gaming, or substantially any datastream or signaling-stream. The foregoing terms are utilized interchangeably in the subject specification and related drawings. The terms "component," "system," "platform," "module," and the like refer broadly to a computer-related entity or an entity related to an operational machine with one or more specific functionalities. Such entities can be hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
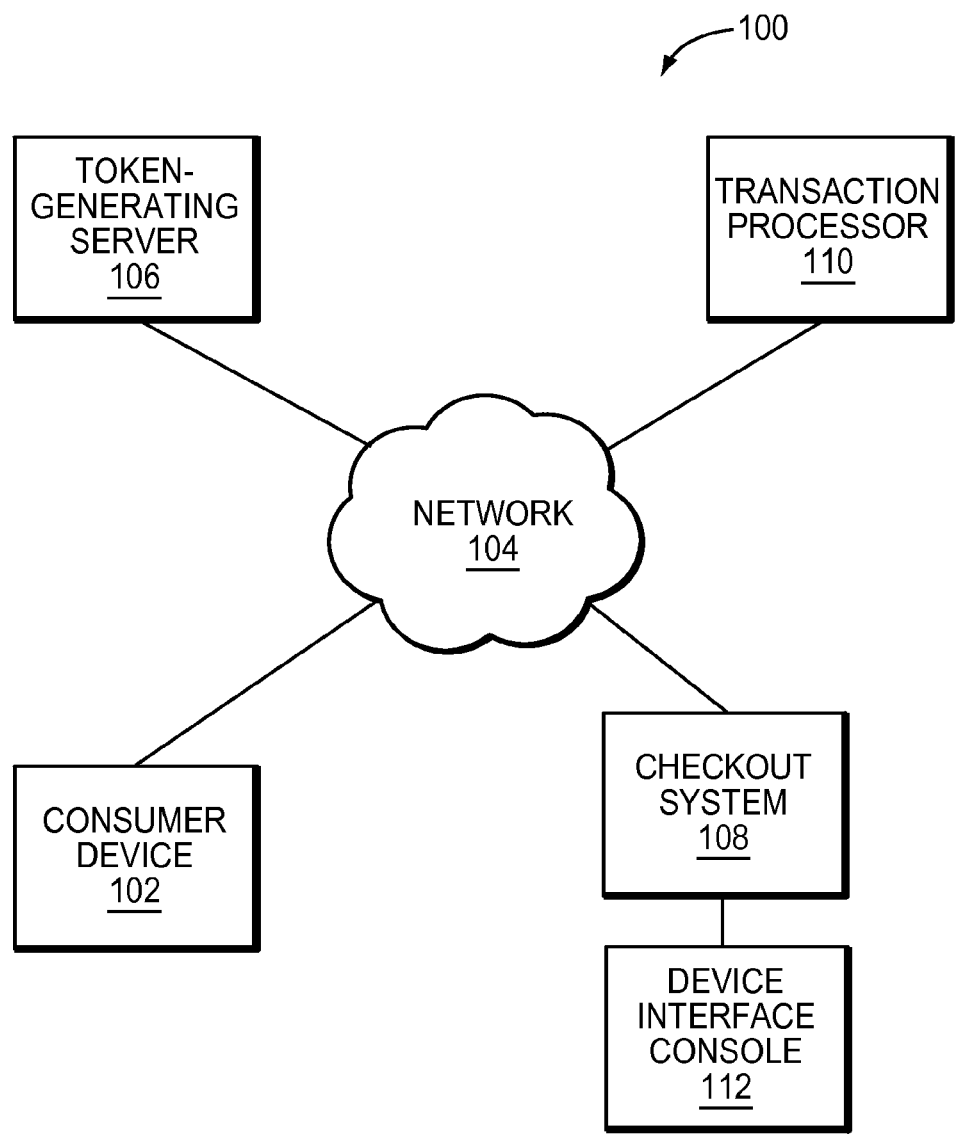
FIG. 1 is a block diagram of an exemplary network in accordance with an embodiment of the invention.

Refer first to FIG. 1, which depicts an exemplary no-touch mobile transaction network 100 including a consumer device (e.g., a mobile device) 102 linked to a network 104 (e.g., a cellular telephone network, the Internet, or any wide-area network or combination of networks capable of supporting point-to-point data transfer and communication) that supports wired, wireless, or any two-way communication. The network 104 connects various devices, including a token-generating server 106, one or more checkout systems 108, and a transaction processor 110 utilizing, again, wired, wireless, or any two-way communications. The token-generating server 106 is responsible for generating unique tokens associated with the consumer; the tokens contain, for example, consumer-identifying information, financial information, coupon information, and/or ticketing information. In response to requests made by a registered user via the consumer device 102, the server 106 generates tokens and transmits them to the consumer device 102 for storage for subsequent presentation to complete a transaction with the checkout system 108. Additionally, in various embodiments, the token-generating server 106 may encrypt the tokens prior to transmission and provide the checkout system 108 and/or the transaction processors 110 with a decryption key.

Each checkout system 108 may be associated with a merchant who offers goods or services for sale to, among others, the consumer possessing the mobile device 102 and who wishes to offer a no-touch checkout experience to the consumer. The checkout system 108 may be a POS system (e.g., an electronic cash register, a ticketing kiosk, etc.) that connects to a device interface console 112. The device interface console 112 is responsible for establishing an NFC channel with an NFC-enabled device 102 within NFC range (e.g., within approximately 20 cm) to request the display of a token, reading and decoding a token, and making the decoded information available to the checkout system 108. In addition, the console 112 may be mobile or physically associated with the checkout system 108. The checkout system 108 may be responsible for completing the transaction based on information provided therein and/or for decrypting any encrypted token information. Alternatively, the checkout system 108 may transmit the token information to the transaction processor 110 to request authorization for the transaction. The transaction processor 110 may be responsible for authorizing the transaction, and, in some cases, for decrypting the token. In one embodiment, the transaction processor 110 is a payment processor responsible for or actually performing the transaction based on financial information included in, or linked to, the token. For example, a so-called "direct" payment processor represents the financial-processing backend provider to credit-card issuers and payment services such as PAYPAL. An "indirect" payment processor is an independent entity processing transactions for multiple payment services and maintains its own records and data. The distribution of responsibility for various aspects of transaction processing among the checkout system 108 and other entities represents a design choice.

Figure 2A:
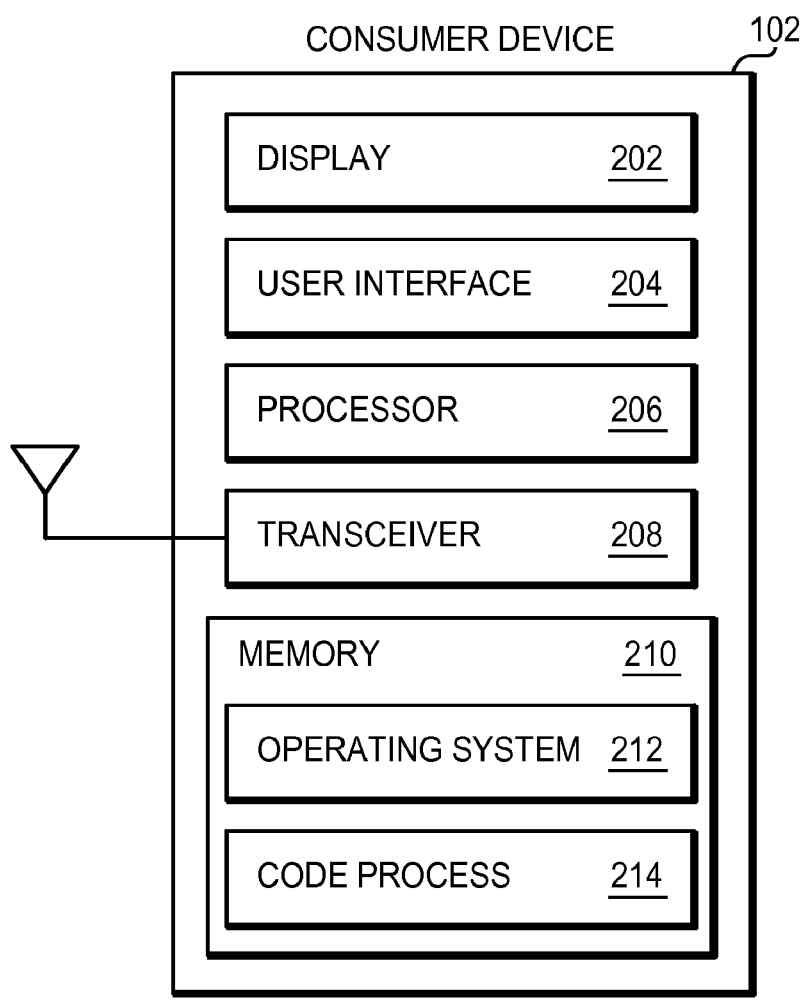
FIGS. 2A and 2B are block diagrams of an exemplary consumer device and checkout system, respectively, in accordance with an embodiment of the invention.

The mobile device 102 acts as a gateway for transmitting the consumer's data to the network 104. The mobile device 102 can support multiple communication channels for exchanging multimedia and other data with the token-generating server 106, the console 112, and other devices using a Wi-Fi LAN (e.g., IEEE 802.11 standard) for Internet access, a short-range Bluetooth wireless connection for point-to-point access, and/or an NFC channel (e.g., IEEE 802.2 standard) for close-proximity access. Referring to FIG. 2A, in various embodiments, a representative mobile device 102 includes a conventional display screen 202, executable instructions encoding a user interface 204, a processor 206, a transceiver 208, and a memory 210. The transceiver 208 may be a conventional component (e.g., a network interface or transceiver) designed to provide communications with a network, such as the Internet and/or any other land-based or wireless network or system, and, through the network, with the token-generating server 106 and the console 112. In various embodiments, the mobile device 102 includes NFC circuitry and an NFC antenna (not illustrated in FIG. 2A) for communicating wirelessly at 13.56 MHz (e.g., according to the ISO/IEC 18092 standard) with other NFC devices, such as checkout system 108, within NFC range. When NFC capabilities are enabled, the device 102 typically operates a background process that continuously polls its environment for NFC devices or tags within NFC range and autonomously establishes an NFC channel with any such device.

The memory 210 includes an operating system (OS) 212, such as GOOGLE ANDROID, NOKIA SYMBIAN, BLACKBERRY RIM or MICROSOFT WINDOWS MOBILE, and a code process 214 that implements the device-side functions as further described below. Additional transactional information may be embedded in the code process 214 for transmission through the network 104 for later processing on a back-end server (e.g., the token-generating server 106). As used herein, the term "mobile device" refers to a "smart phone" or tablet with advanced computing ability that, generally, facilitates bi-directional communication and data transfer using a mobile telecommunication network, and is capable of executing locally stored applications and/or payment transactions. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.), tablets, such as the IPAD and KINDLE FIRE, and personal digital assistants (PDAs). The memory 210 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit.

In operation, with reference to FIGS. 1 and 2A, a user downloads and operates an executable, interactive application (an "app") onto his mobile device 102, creating, on first use, an account with to the token-generating server 106—e.g., supplying identifying information and creating a username/password pair or other strong form of authentication for logging in to the server 106 to retrieve a token. The app may include code that renders it self-launching upon NFC data exchange with an interface console 112; in this way, once the app is downloaded, the user may execute it simply by bringing his NFC-enabled device 102 within NFC range of the device interface console 112 as described in greater detail below. Alternatively, the user may launch the app by selecting, for example, a button or icon displayed on device 102. When launched on the mobile device 102, the app causes display of a token by retrieving, from the memory 210, a stored token previously downloaded from token-generation server 106; alternatively, the app may cause the mobile device 102 to communicate with the token-generating server 106, providing the username/password identifying information to request a token. In the latter case, when a token is requested, the identifying information is verified, and the token-generating server 106 looks up the consumer's account data and generates a token for the consumer.

The token contains data that identifies the consumer and/or the token, and may contain actual financial account information, coupon information, and/or ticketing information or may instead contain information (such as an email address, telephone number, or random unique data) that can be mapped to the consumer's account by the transaction processor 110. In one embodiment, before being sent, the token is encrypted using, for example, a private key. The encrypted token is then transmitted to the mobile device 102. The token-generation process may take place at any time after a consumer registers an account and the token may be delivered to the mobile device 102 at any time a network connection can be established. Accordingly, generation of the token and delivery of the token may occur as two separate steps and may not happen at the same time. In one embodiment, the mobile device 102 stores a stack of tokens that may be rotated periodically or upon a triggering event, such as display. Additionally, the app may receive and store multiple tokens for various types of transactions and in response to a request for a specific type of token retrieve the appropriate token from storage in device 102.

Figure 2B:
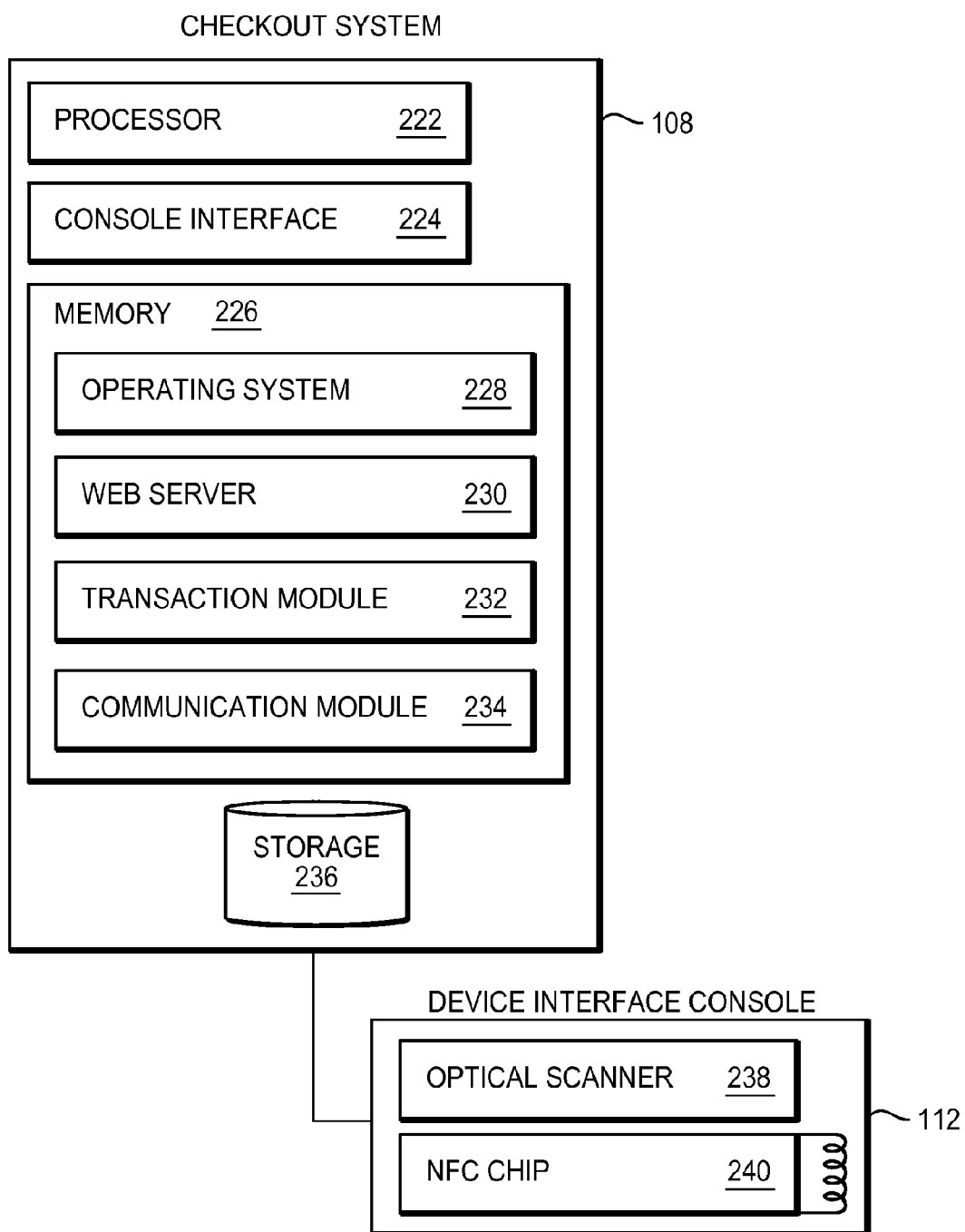

The checkout system 108 may be configured to offer the consumer possessing mobile device 102 a no-touch checkout experience. Referring to FIG. 2B, in various embodiments, the checkout system 108 includes a processor 222, a console interface 224, and a memory 226, which may include volatile and non-volatile portions. The memory 226 contains instructions, conceptually illustrated as a group of modules, that control the operation of the processor 222 and its interaction with hardware components. An operating system 228 directs the execution of low-level, basic system functions such as memory allocation, file management, and operation of mass storage devices. At a higher level, a web server block 230, a transaction module 232, and a communication module 234 perform the basic system functions described in greater detail below. The communication module 234 may be a conventional component (e.g., a network interface or transceiver) designed to provide communications with a network, such as the Internet and/or any other land-based or wireless telecommunications network or system, and, through the network, with the transaction processor 110 and, in some embodiments, the console 112 and the token-generating sever 106. The web-server block 230 enables web-based communication and can be a conventional web-server application executed by the processor 222. The transaction module 232 is responsible for evaluating the decoded data contained within a token obtained via the console interface 224 from the console 112 and processing the transaction according to the information contained therein. The transaction module 232 may be configured to process transactions to best suit the merchant's checkout needs. For example, the transaction module 232 may be configured to accept payment tokens and determine whether to accept payment based on the information contained therein. The transaction module 232 may save transactional information in a storage device 236 for immediate or later transmission through the network 104 for processing on a back-end server (e.g., the transaction processor 110). Additionally, the transaction module 232 may store one or more decryption keys obtained from the token-generating server 106 and, using one of the keys, may decrypt the token obtained via the console interface 224. Alternatively, the transaction module 232 may send the token and transactional information to the transaction processor 110 for verification of token validity and/or the consumer's ability to pay before processing the transaction.

The checkout system 108 is physically or remotely connected to, or includes, the device interface console 112, which is capable of communicating over an NFC channel with a mobile device 102 within NFC range. For example, in response to the polling signal, the communication module 234 may send a message to the device 102 that causes it to display a token in connection with the transaction; for example, the message may "wake up" an app running in the background on the device 102. Once the token is displayed, the console 112 may read the token using any suitable modality, providing a no-touch checkout experience for the consumer. Thus, the term "display" broadly connotes presentation, e.g., as an optically readable pattern on the display 202 of the device 102 or as data communicated by NFC. The console 112 contains an optical scanner 238 and an NFC communication chip 240, enabling it to read data optically or via NFC, and may contain further communication capabilities if interaction over other communication modalities is desired.

The scanner 238 may be any form of optical scanner capable of reading and decoding an optically displayed token, such as a barcode or QR code. In various embodiments, the scanner 238 is configured to continuously, or periodically, scan its environment to detect an optical token within its field of view. Alternatively, or in addition, the checkout system 108 may signal the scanner 238, via the console interface 224, that a barcode is expected when a mobile device has been detected within NFC range. The NFC communication chip 240 contains NFC circuitry, an NFC antenna (e.g., a loop-inductor-antenna), and a memory for storing data. The NFC chip 240 is capable of operating the console 112 to communicate wirelessly, for example, at 13.56 MHz with other NFC devices within NFC range to transmit and receive data. A message communicated by the NFC chip 240 may contain a request to open, or a URL for, the client app downloaded on mobile device 102; when read, the message triggers the app to open and display a token. Additionally, in some embodiments, that message also contains a request for a specific type of token (e.g., a payment token). In various embodiments, this message is modifiable and/or customizable to the merchant's type of business or checkout needs. The NFC communication chip 240 may draw power from the console 112 or checkout system 108 and be capable of operating in both passive and active modes; in various embodiments, the operating mode may be selected manually by an operator of the checkout system 108. When operating in active mode the NFC communication chip 240 may poll its environment to detect other NFC devices within range and establish an NFC communication channel with the detected device. Alternatively, the chip 240 may be an NFC tag (i.e., ISO 14443 or FeLiCa compliant) that functions without any battery or power source of its own. Instead, when the consumer brings his NFC-enabled mobile device 102 within NFC range of the tag by "tapping" his device to the console 112, the NFC tag 240 becomes powered by the mobile device's signal and, for example, may modulate the polling signal to send data to the mobile device. In this embodiment, it is possible to convert any optical scanner 238 to operate in accordance herewith merely by affixing such a tag (e.g., in the form of a sticker) to the scanner.

Figure 3A:
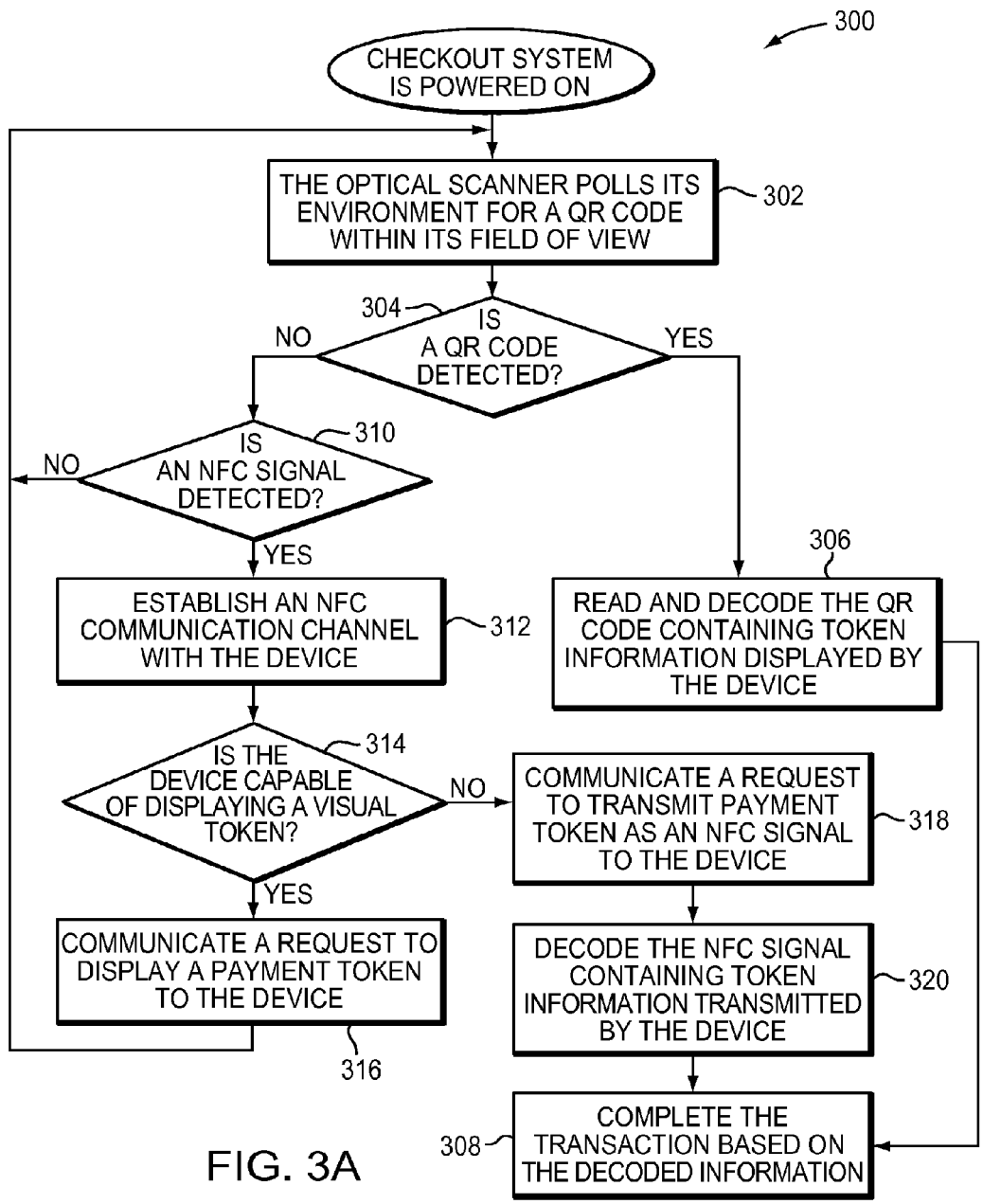
FIGS. 3A and 3B depict exemplary methods of operating the checkout system in accordance with embodiments of the invention.

With reference to FIG. 3A as well as FIGS. 1, 2A, and 2B, a flowchart 300 depicts a set of exemplary operations of the checkout system 108 in accordance with an embodiment of the invention. The sequence 300 enables the checkout system 108 to facilitate a no-touch mobile transaction experience for the consumer with an NFC-enabled device 102. Additionally, the system 108 is capable of conventionally processing a transaction, albeit without offering a one-touch experience for the consumer, with a mobile device 102 able to display the token in visual form but which is not NFC-enabled. (The mobile device 102 may either not have NFC capabilities or the consumer may have chosen to disable NFC to, for example, conserve power.) Additionally, it should be noted that the consumer has the option at any time (even on an NFC-enabled device) of manually opening the client app downloaded to her device 102 to display a stored token. The optical scanner 238 of the console 112 may be in a continuous ready mode, reading an optically displayed token as soon as it is brought within reading range (step 302). Accordingly, in the event that the consumer elects, for any reason, to display the token by manually selecting a button on her mobile device 102 to execute the app, the QR code will be detected by the optical scanner 238 when she places the device 102 with the display 202 (already displaying the QR code) in view of the scanner. Upon detection (step 304), the optical scanner reads and decodes the QR code (step 306) making the decoded information available, via the console interface 224, to the checkout system 108 to complete the transaction based on the information (step 308).

If the mobile device 102 is NFC-enabled, the consumer may choose to execute the client app and present a token simply by tapping her device 102 to the console 112. Once an NFC-enabled device 102 is detected by the checkout system 108, a high-frequency magnetic field is created between the loosely coupled coils of the NFC antennas in the mobile device 102 and the console 112 (step 310). Once this field is established, a connection is formed and information can be passed between the device 102 and the console 112 (step 312). Where both the console 112 and mobile device 102 are operating in active NFC modes, a handshake may take place in which the roles are assigned, or the devices may take turns operating as interrogator and target in the half-duplex standard of NFC communication. The system 108 may query, via the NFC chip 240, the device 102 to determine whether the device is capable of displaying a token in visual form (step 314), and if so, signaling a request to execute the client app that will display a token without any action from the consumer (step 316). The optical scanner 238, operating responsively or independently of the NFC chip 240, detects the token displayed by the device 102 (step 304). For example, the checkout system 108 may receive notification from the console 112 that an NFC device has been detected in range, and that the device possesses adequate graphical capability to display a token; the system 108, in turn, signals the optical scanner 238 that token presentation is imminent. In response, the scanner 238 may "wake up" to detect the token immediately upon its presentation. The optical scanner 238 reads and decodes the token information (step 306) and transmits the data through the console interface 224 to the checkout system 108. If, however, the system 108 determines that the device 102 cannot display the token visually, the console 112, via the NFC chip 240, may request the token information from the device 102 as an NFC signal (step 318). The console 112 then electronically decodes the token upon receipt thereof (step 320) and transmits the data through the console interface 224 to the checkout system 108. In one embodiment, a secure NFC communication channel may be first established and all token information sent in encrypted form.

The transaction module 232 then determines how to process the transaction based on the information received from the console 112 (step 308). For example, the transaction module 232 may decide whether to accept the consumer's payment based on the decoded token information, saving the transactional information in the storage device 268 for later transmission through the network 104 for processing on a back-end server (e.g., the transaction processor 110). Alternatively, the transaction module 232 may send the token to the transaction processor 110 for verification of the validity and/or the consumer's ability to pay before processing the transaction. Additionally, the transaction module 232 may store one or more decryption keys obtained from the token-generating server 106 and use one of these to decrypt the token prior to evaluating the information contained therein. The transaction module 232 may authorize a transaction based on any successfully decrypted token, or may instead additionally evaluate the decrypted token information.

Given the widespread adoption among consumers of wireless devices (e.g., smartphones or tablets) with advanced graphical displays, the merchant may deem it unnecessary to have a checkout system 108 capable of receiving a token via NFC. In such cases, the NFC chip 240 in console 112 may be a simple NFC tag that functions without any battery or power source of its own. As described above, when the consumer brings his NFC-enabled mobile device 102 within NFC range of the tag by "tapping" his device to the console 112, the NFC tag 240 becomes powered by the mobile device's signal. Alternatively, the checkout system 108 may have a conventional NFC chip 240 set to operate in a passive mode.

Figure 3B:
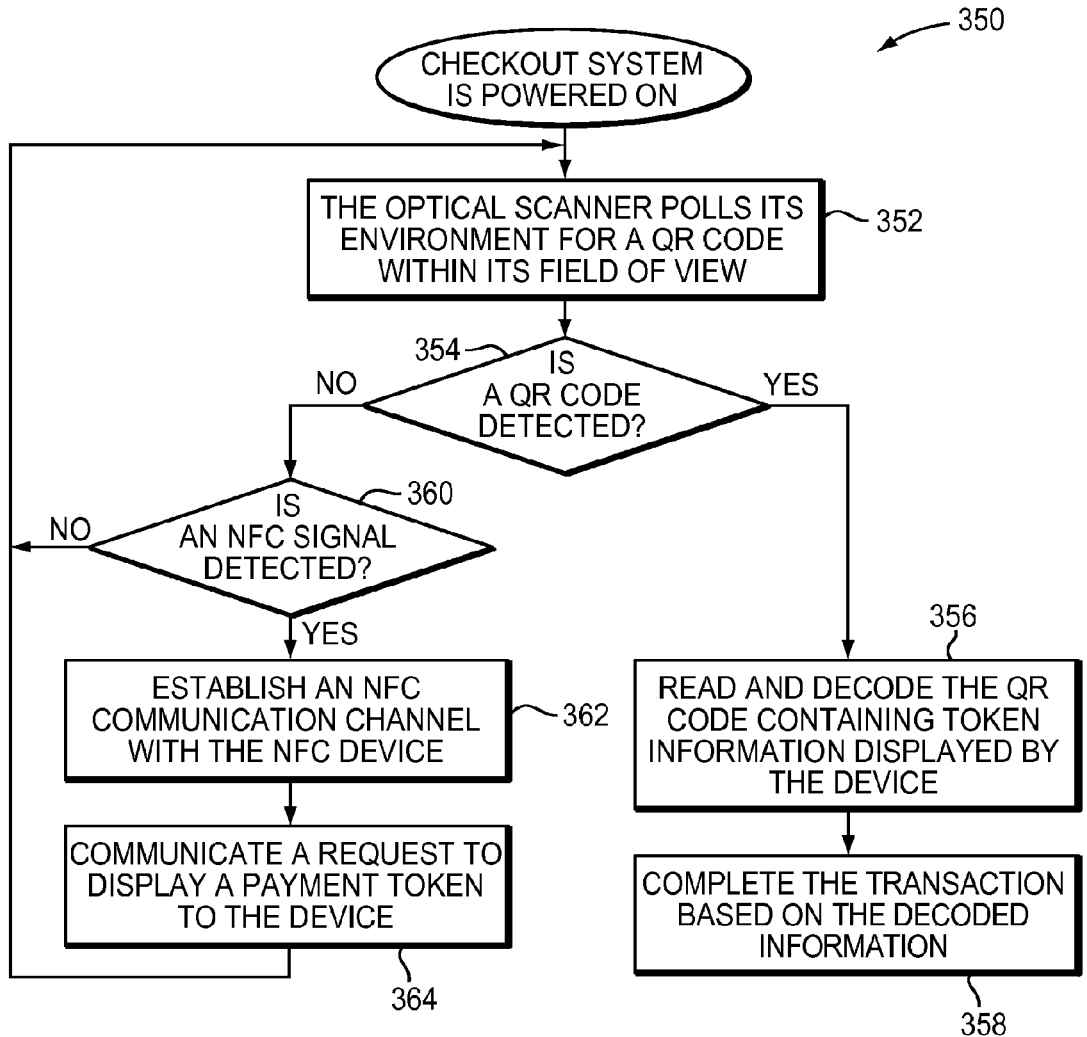

FIG. 3B illustrates this simplified mode of operation. As described previously, the optical scanner 238 may be operated so as to be continuously ready to read an optically displayed token in the form of, for example, a QR code (step 352). In the event that the consumer elects to display the token by manually selecting a button on her mobile device 102 to execute the app, the QR code will be detected by the optical scanner 238 when the consumer places the display 202 of the device 102 in view of the scanner (step 354). Upon detection of the token, the optical scanner reads and decodes it (step 356), making the decoded information available, via the console interface 224, to the checkout system 108 to complete the transaction based on the information (step 358).

If the mobile device 102 is NFC-enabled, the consumer may choose to execute the client app and display a token simply by tapping her device 102 to the console 112. When the consumer brings his NFC-enabled mobile device 102 within NFC range of the NFC tag 240 by tapping his device to the console 112, the tag 240 becomes powered by the mobile device's signal (step 360). NFC information can be passed between the device 102 and the console 112 (step 362). The mobile device 102, operating in an active NFC mode, acts as the interrogator; the tag may respond simply by modulating the reading signal, or may draw power from the signal to operate in an active mode that facilitates data exchange. The mobile device 102 may send, for example, an interrogation message to the NFC tag 240 to find out what type of communication it uses, such as Type A/B or FeLiCa. When the NFC tag 240 responds, the interrogating mobile device 102 sends its first commands in the appropriate fashion. The commands may be transmitted, for example, using phase jitter modulation (PJM) to modify the surrounding field and send out a signal, or using any suitable modality known to those in the art. The NFC tag 240 receives the instruction and checks if it is valid. If it is a valid request, the tag 240 responds with a message that, when read by the device 102, triggers the app to open and ultimately display a visual token without any action from the consumer (step 364). The optical scanner 238 detects the token that is now on display within its field of view. The optical scanner 238 reads and decodes the token information (step 356) and transmits the data through the console interface 224 to the checkout system 108. As previously described, the transaction module 232 then determines whether to authorize the transaction immediately or undertake further processing (step 358).

Figure 4:
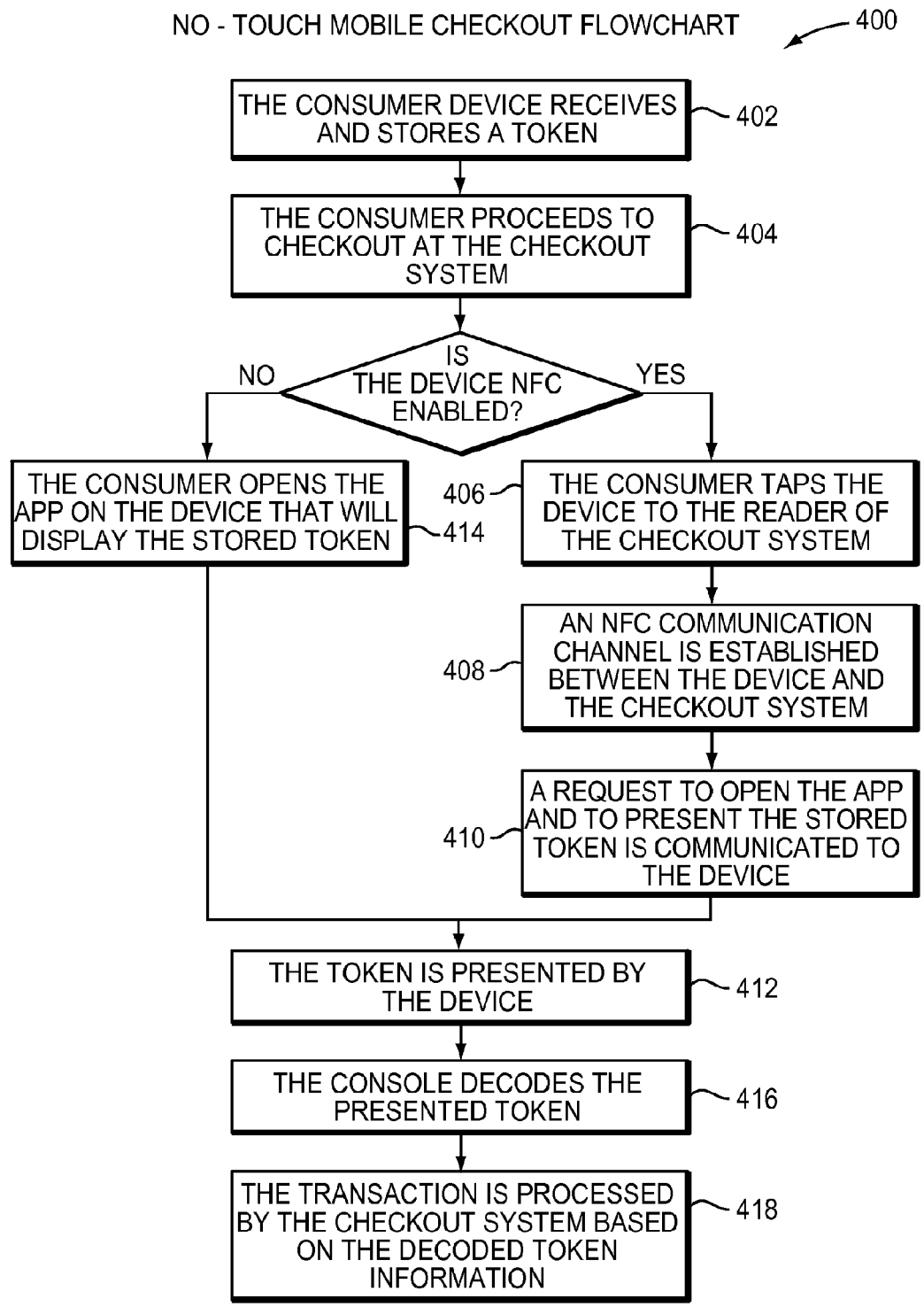
FIG. 4 is a flowchart illustrating operation of a mobile device interacting with a checkout system as depicted in FIGS. 3A and 3B.

FIG. 4 illustrates the operations undertaken by the mobile device 102. As described above, one or more tokens are received and stored by the mobile device 102 via the client app associated with token-generating server 106 (step 402). The consumer proceeds to the checkout system 108 to complete a transaction (step 404). The transaction may be payment for goods or services or, for example, the token may be a ticket (e.g., an airline ticket) for an event or service. If the consumer's device 102 is NFC enabled, he may simply bring it within NFC range of the console 112 (step 406), position it with the display 202 in view of the optical scanner 238 if visual token display is available on his device, and await completion of the transaction. When the two devices are in NFC range, NFC communication is established and information is passed between the device 102 and the console 112 without any further action by the consumer (step 408). The mobile device may assume the role of interrogator. requesting information from the NFC chip (or tag) 240. The NFC chip 240 responds with a message that contains a request, or a URL, that when read by the mobile device 102 triggers the device to execute the downloaded app (step 410). In one embodiment, the message contains a request specifying the type of token that should be displayed for the particular checkout system 108 and/or the type of transaction. Alternatively, the consumer may have different applications stored on her device 102 for various transaction types (e.g., payment, discount, ticketing, etc.,) and the NFC message contains an instruction to open the appropriate app. For example, the console 112 may be associated with an airline and used to collect mobile tickets at a security checkpoint or a boarding gate. In this example, the NFC message embedded in the NFC chip 240 requests the presentation of a token containing airline ticketing information, and the app responsively presents (visually or as an NFC signal) the appropriate token stored in the memory 210 of the mobile device 102 without requiring action from the consumer (step 412). Alternatively, if the mobile device 102 is not NFC-enabled at the time of checkout, the consumer executes the app by selecting an icon displayed on device 102 (step 414). Upon detection of a visually displayed token in the form of, for example, a QR code, the optical scanner 238 reads and decodes the QR code and makes the decoded information available to the checkout system 108 (step 416), processing the data to complete the transaction (step 418).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, each of the processors described herein may be a general-purpose computer, but alternatively may be a CSIC (consumer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The various modules and apps described herein can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of processing a transaction between a consumer and a merchant, the method comprising:
   receiving, from a remote token-generating server, a token by a device of the consumer and storing the token in a memory of the device;
   positioning, by the consumer, the device within communication range of a merchant checkout system using a first communication modality;
   if the device is enabled for the first communication modality, (i) establishing, without action by the consumer, a first communication channel between the device and the checkout system using the first communication modality, (ii) communicating, by the checkout system, over the first communication channel a request to provide the stored token over a second communication modality different from the first communication modality, (iii) in response to the request, communicating, by the device, the stored token via the second communication modality, (iv) reading and electronically decoding, by the checkout system, the token upon presentation thereof by the device using the second communication modality, and (v) completing, by the checkout system, the transaction based at least in part on the decoded token information; and
   if the device is incapable of communications using the first communication modality, (i) in response to an action by the consumer, communicating, by the device, the stored token via the second communication modality, (ii) reading and electronically decoding, by the checkout system, the token upon communication thereof by the device, and (iii) completing, by the checkout system, the transaction based at least in part on the decoded token information.

2. The method of claim 1, wherein the first communication modality is a short-range wireless connection.

3. The method of claim 1, wherein the second communication modality is optical communication.

4. The method of claim 1, wherein the method includes the step of electronically decoding, by the checkout system, the token upon reading the token from the consumer device.

5. The method of 2, wherein the short-range wireless connection is NFC, Bluetooth, or iBeacon, and further comprising the step of causing the checkout system to poll its environment by regularly transmitting an NFC, Bluetooth, or iBeacon signal detectable by NFC, Bluetooth, or iBeacon circuitry within range.

6. The method of claim 1, further comprising receiving and storing, at the device, a plurality of tokens, and wherein the request specifies a type of stored token to display.

7. A checkout system comprising:
   communication circuitry for (i) establishing a communication channel with a device using a first communication modality and (ii) communicating over the communication channel a request to provide a token over a second communication modality different from the first communication modality;
   a reader for reading a token provided over the second communication modality; and
   a processor for decoding the token and completing the transaction based at least in part thereon and, if a device in proximity to the checkout system is not capable of communicating using the first communication modality, causing the reader to read a token provided by the device over the second communication modality and electronically decoding the read token, and completing the transaction based at least in part thereon.

8. The system of claim 7, wherein the first communication modality is a short-range wireless connection.

9. The system of claim 7, wherein the second communication modality is optical communication.

10. The system of 8, wherein the short-range wireless connection is NFC.

11. The system of claim 10, wherein the communication circuitry is contained in an NFC tag.

12. The system of claim 11, wherein the communication circuitry is configured to be powered by an external NFC signal.

* * * * *